United States Patent

[11] 3,556,108

| [72] | Inventors | William H. Knapp<br>Davenport, Iowa;<br>Richard A DePauw, East Moline; Caroll Q.<br>Gochanour, Moline, Ill. |
|---|---|---|
| [21] | Appl. No. | 784,054 |
| [22] | Filed | Dec. 16, 1968 |
| [45] | Patented | Jan. 19, 1971 |
| [73] | Assignee | International Harvester Company<br>Chicago, Ill.<br>a corporation of Delaware |

[54] COMBINE GRAIN CLEANER
9 Claims, 4 Drawing Figs.

[52] U.S. Cl. .................................................... 130/27
[51] Int. Cl. ................................................ A01f 12/32
[50] Field of Search .......................................... 130/21, 22,
23, 24, 25, 26, 27.8F, 27.17, 27

[56] References Cited
UNITED STATES PATENTS

| 963,887 | 7/1910 | Freeze .......................... | 130/30 |
| 1,729,199 | 9/1929 | Wood .......................... | 130/24 |
| 2,849,118 | 8/1958 | Ashton .......................... | 130/24 |
| 2,995,135 | 8/1961 | Krum .......................... | 130/23 |
| 3,373,871 | 3/1968 | Huether .......................... | 130/27 |

*Primary Examiner*—Antonio F. Guida
*Attorney*—Noel G. Artman

ABSTRACT: A grain pan and cleaning system for a self-propelled combine in which the grain pan is dimensioned to fit between the combine drive wheels and in which the cleaning system which is located rearwardly of the drive wheels extends transversely beyond the grain pan. The device also includes means for distributing the material from the relative narrow swath of the grain pan to the relative wide swath of the cleaning system.

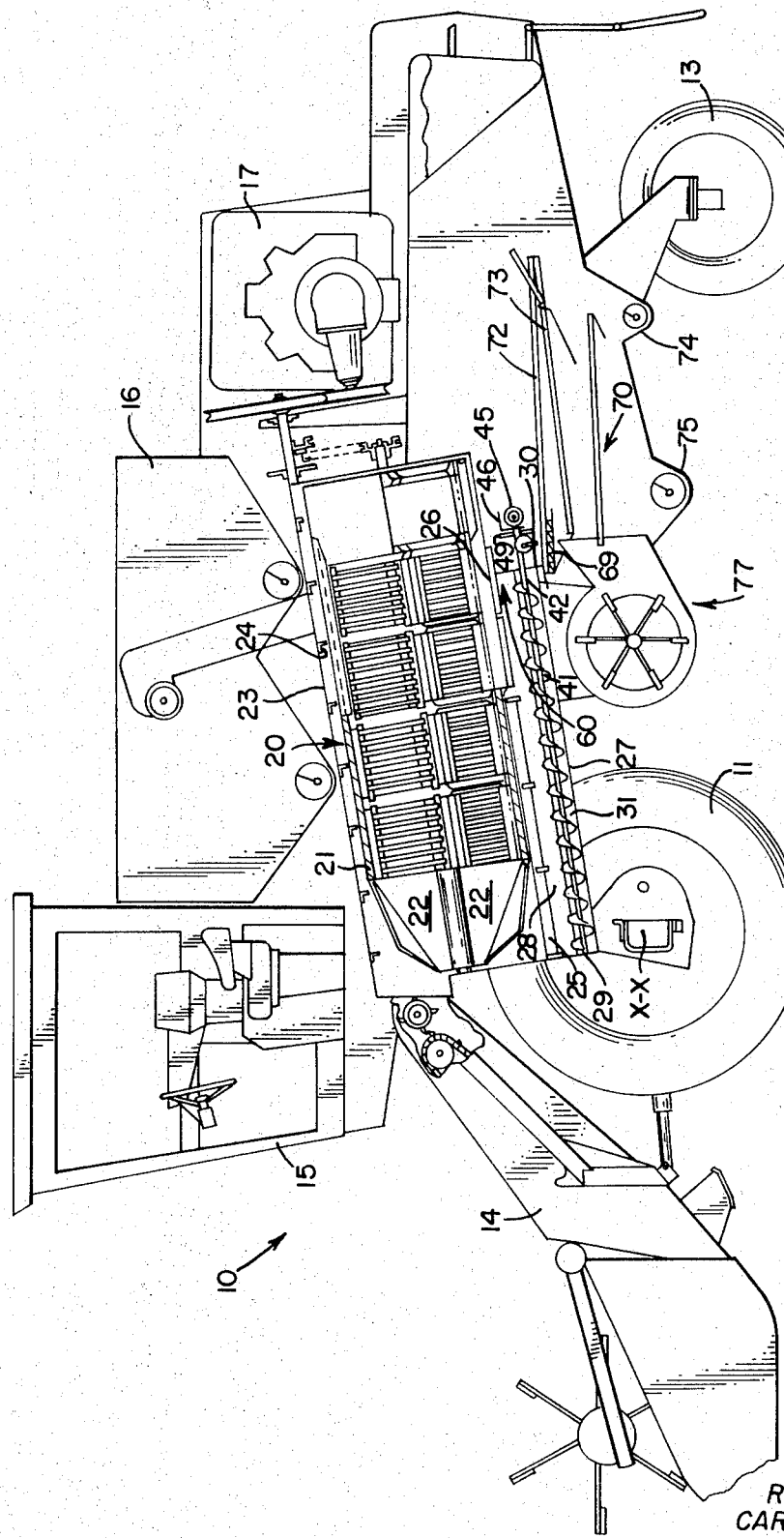

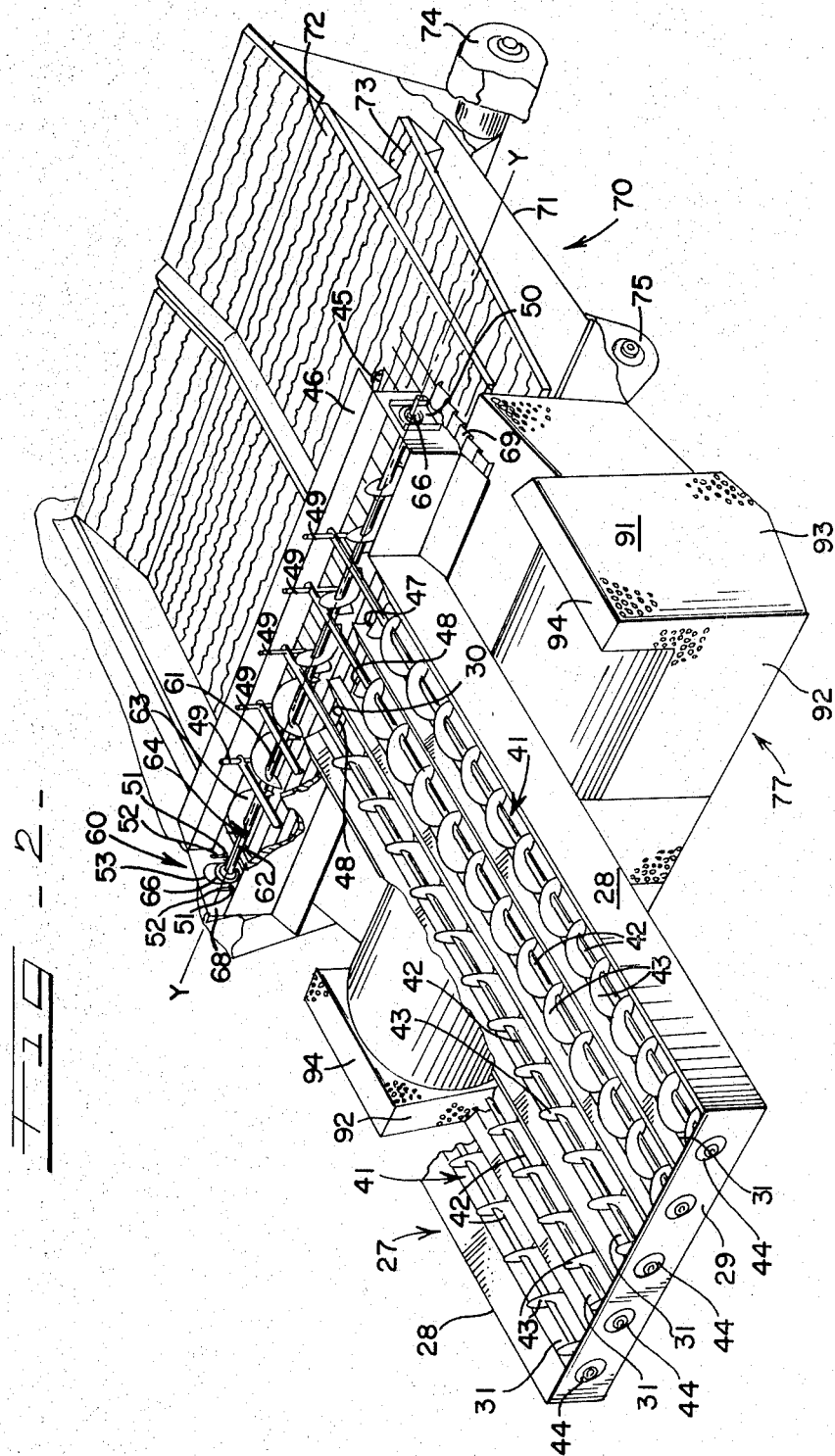

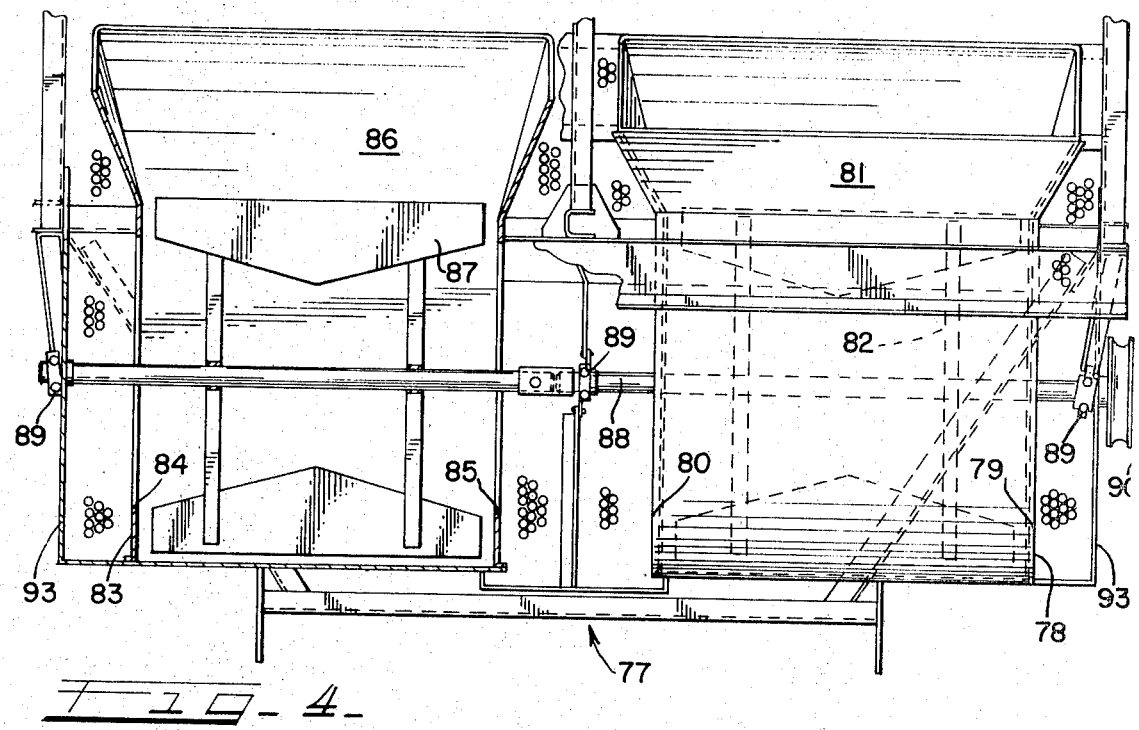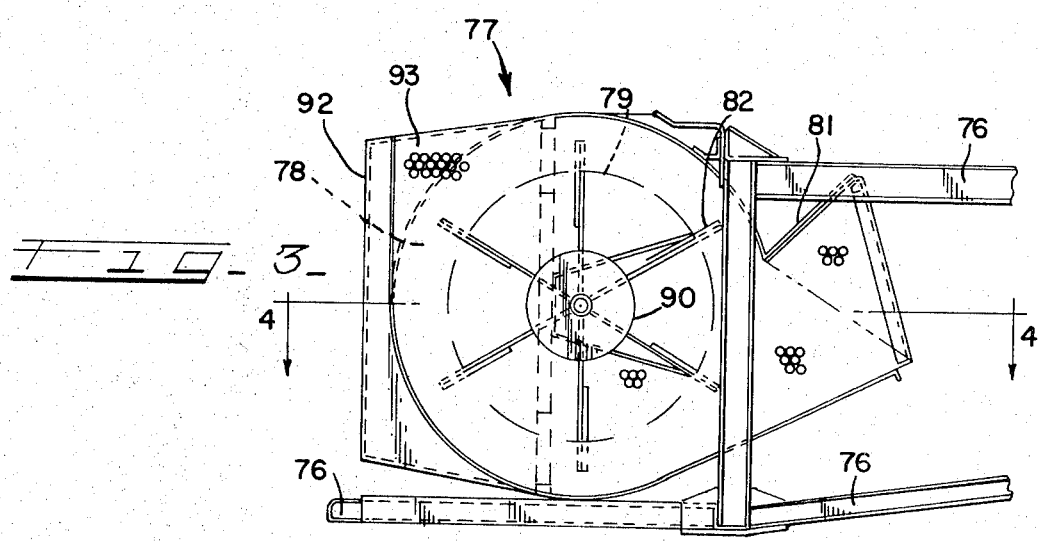

COMBINE GRAIN CLEANER

BACKGROUND OF THE INVENTION

1. Field of the Invention

The present invention relates generally to improvements in combines and the like and more particularly to a new and improved cleaning system for a combine wherein the cleaning system is located rearwardly of the combine drive wheels and extends transversely thereof wider than the threshing and separating sections of the combine to thus increase the area of the cleaning system without increasing the overall transverse dimension of the combine.

2. Description of the Prior Art

The modern self-propelled combine represents a basic design that has evolved from the original McCormick reaper of 1831. In reviewing the development of combines over this period it becomes obvious that solutions to the material handling problem has been an important factor in progressing toward the present design. The prior art describes machines in which the material follows a tortuous path through the machine as it is threshed, separated, cleaned and stored. The design that has evolved and is found in commercially available machines incorporates a substantially straight feed line and utilizes gravity whenever appropriate. Thus the trend has been toward simplicity and low power consumption. Consistent with this trend the threshing, separating and cleaning systems of a given model combine are all of an equal width and process a continuous ribbon of material through the machine. The width of the various combine components is such that they fit between the combine's large drive wheels thus providing a stable design.

As the various systems of the combine evolved toward the present structure it has become increasingly difficult to make additional improvements. However, because of the large volume of material processed by a combine an improvement increasing the capacity by a small percent or reducing grain losses by a small percent it is a significant innovation.

One of the key indicators of a combine's capacity is the total cleaning area which is customarily stated in square inches. A cleaning system of a given area can process a certain maximum amount of material at acceptable grain loss rates and increasing the amount of material results in disproportionately large increases of grain losses. Thus the cleaning system constitutes a bottleneck limiting the amount of material that can be processed through the machine. To utilize improvements in the threshing and separating systems of the combine we must provide a cleaning system that can process the additional material. The present invention accomplishes this by incorporating a wider conventional cleaning system into the straight line flow pattern of the combine. This has been accomplished without increasing the overall dimensions of the combine and thus makes it possible to utilize improvements in the threshing and separating systems of the combine without increasing the overall dimensions of the machine.

SUMMARY

The general purpose of this invention is to provide a combine with a cleaning system which embraces all the advantages of similarly employed cleaning systems and has a greater capacity. To attain this the present invention contemplates a unique arrangement whereby the cleaning system is wider than the threshing and separating sections. The cleaning system is located behind the combine's large drive wheels and extends outwardly thereof toward the outer extent of the wheels. This arrangement permits the use of a larger cleaning system without increasing the overall dimensions of the combine. The invention further includes a unique arrangement for uniformly spreading the material from the width of the threshing and separating sections to the relative wider width of the cleaning unit. Another unique feature of the invention is the arrangement of the fan for the cleaning system which includes two end feed fans axially aligned such that there are four air inlets. An object of this invention is to increase the capacity of a combine cleaning system without increasing the overall dimensions of the machine.

BRIEF DESCRIPTION OF THE DRAWING

FIG. 1 is a side view of a combine having portions broken away to show the threshing, separating and cleaning components;

FIG. 2 is an isolated view of the grain pan and cleaning system;

FIG. 3 is a side view of the fan means; and

FIG. 4 is a plan view of the fan means in which a cross-sectional view taken along the line 4—4 of FIG. 3 is shown at one of the end feed casings.

DESCRIPTION OF THE PREFERRED EMBODIMENT

Referring now to the drawings wherein like reference characters designate like or corresponding parts throughout the several views there is shown in FIG. 1 a self-propelled combine designated 10 having front drive wheels 11 (only one shown) arranged for rotation along a transverse axis designated X–X and rear dirigible wheels 13 (only one shown). The combine 10 includes a header 14 and operator's cab 15, a grain tank 16 and an engine 17.

In FIG. 1 and sidewall of the combine is broken away so that the threshing, separating and cleaning mechanisms of the combine can be seen. The threshing and separating mechanisms 20 are of the axial flow type and include an elongated rotor 21 having impeller blades 22 at the input end thereof. The rotor 21 is mounted within a cylindrical casing 23 which has spiral flighting 24 along its upper internal surface. The lower portion of the cylindrical casing 23 is formed of a concave 25 and a grate 26. A more complete disclosure of an axial flow combine of this type can be found in U.S. Pat. No. 3,481,342 to Rowland-Hill et al. of Dec. 2, 1969.

Grain that has been threshed and separated passes through the concave 25 and the grate 26 and falls upon the elongated grain pan 27 which underlies the cylindrical casing 23. It should be noted that the entire threshing and separating mechanisms 20 is of a width such that it will fit between the front drive wheels 11 of the combine. The wheel tread of combines is adjustable over a range and thus the threshing and separating mechanism is designed for the minimum tread. The elongated grain pan 27 underlies the entire threshing and separating mechanisms 20 and thus the longitudinal outer edges 28 of the grain pan 27 define the outer limits of the threshing and separating mechanisms 20. The grain pan 27 has a front wall 29 and a back transverse ledge designated 30. The upper surface of the grain pan 20 is formed of a plurality of longitudinal troughs 31 that extend the entire length of the grain pan 27.

Means 40 function to feed the material collected in the grain pan rearwardly. The means 40 include a pan auger 41 comprised of a core 42 and flighting 43 for each of the longitudinal troughs 31. A bearing 44 carried by the front wall 29 supports the forward end of each of the pan augers 41. A transverse drive means 45 extends normal to the pan augers 41 and through bevel gears or the like (not shown) provides the drive for the pan augers 41. A shield 46 protects the intersection of the pan augers 41 with the transverse drive means 45. It should be noted that in the grain pan 27 illustrated in FIG. 2 there are five troughs 31 and cooperating pan augers 41. For the purpose of this discussion the pan auger 41 in the foreground shall be referred to as the first auger and the others in succession as the second, third, fourth and fifth augers. As can be seen in FIG. 2 the first auger has a terminal edge 47 that is substantially in alignment with the transverse ledge 30 of the grain pan. Although it is not shown in FIG. 2 the fourth and fifth augers likewise have terminal edges that are in substantial alignment with the transverse ledge 30. The second and third augers have terminal edges 48 that are located forwardly of the transverse ledge 30. As can also be seen in FIG. 2 the flighting of the first and second augers extend in one direction while the flighting on the third, fourth and fifth augers extend in the opposite direction. Thus when all the augers are rotated in the same direction by the transverse drive means 45 the first and second augers will exert an opposite transverse force to the grain than will the third, fourth and fifth augers. The augers 41 are rotated in a direction such that the outermost augers tend to exert a force on the grain to spread the material from the width of the grain pan 27 to the relatively wider width of the cleaning system 70. The reason for terminating the edge 48 of the central auger forward of the transverse ledge 30 is to reduce the effect of the transverse force exerted by this auger on the material and thus the resultant component of force on the material in this trough is exerted more rearwardly than the corresponding component of force of the fourth auger. It has been found that terminating the edges of the second and third augers at a point forward of the transverse ledge thus directing the resultant vectors of these augers to a more rearward direction results in an optimum pattern for a five auger bed. The core 42 of the pan augers 41 is free of flightings from the transverse ledge 30 to the shield 46. At a point adjacent the shield 46 each of the pan augers 41 has secured thereto a beater finger 49 which extends perpendicular to the core 42.

Although the pan augers are designed such that they will tend to widen the flow of material from the width of the grain pan 27 to the width of the grain cleaning system 70 an additional distributing means 60 is required to insure an even distribution of the material across the width of the grain cleaning system. The distributing means 60 includes a cross auger 61 having a core 62 and flighting 63. The flighting is arranged such that upon rotation of the cross auger 61 material is spread in both directions from the midpoint of the auger. The axis Y-Y of the cross auger 61 is located below the cores 42 of the pan augers 41. In the embodiment illustrated in FIGS. 1 and 2 the axis Y-Y of the cross auger is related to the cores 42 of the pan augers such that it is necessary to provide a break in the flighting 63 of the cross auger. However, it should be understood this is for illustrative purposes only and that by using a smaller diameter flighting for the cross auger or lowering the axis slightly a continuous flighting 63 could be used. The flighting 63 extends outwardly toward the outer limits of the grain cleaning system 70. However, it has terminal edges designated 64 short of the outer extent of the grain cleaning system. The outer ends of the core 62 are supported in bearings 66 having mounting plates 50. The mounting plates 50 are secured to the outer surface of walls 68 by fastening means 51 that extend through slots 52 formed in walls 68. Elongated openings 53 are formed in walls 68 to thus permit vertical adjustment of cross auger 61.

There is a short shaker pan designated 69 which underlies the cross auger 61 and extends across the entire width of the grain cleaning system 70 from one outer wall 68 to the other. The short shaker pan 69 oscillates along with the sieves of the grain cleaning system to thus move the material collected thereon rearwardly such that it falls toward the sieves of the grain cleaning system.

The grain cleaning system 70 is wider than the conventional system in that it extends toward the outer limits of the large drive wheels 11. In so doing the area of the grain cleaning system is increased substantially while the overall dimensions of the machine remain the same. Thus the outer edges 71 of the grain cleaning system lie along the outermost limits of the combine as defined by the front drive wheels 11. The grain cleaning system 70 includes an upper sieve 72 and a lower sieve 73 which are of conventional design, a further disclosure is not considered necessary for an understanding of the subject invention. There is a tailings trough located adjacent the rear edge of the lower sieve 73 and a clean grain trough 75 located beneath the forward portion of the lower sieve 73. As is well known in the combine art material that does not pass through the sieves is collected in the tailings auger and conveyed back to the threshing and separating mechanisms 20 for reprocessing. All of the clean grain that has been processed through the combine is collected in the clean grain trough 75 and conveyed by an elevator into the grain tank 16.

The clean grain system 70 includes fan means 77 that differ from the fan means found in a conventional cleaning system. In a conventional cleaning system the fan means include a single feed casing that draws air in through both ends and discharges it through a nozzle that directs a stream of air rearwardly through the sieves. In the subject invention the grain cleaning system 70 has been widened to a point that if a fan means of a conventional diameter were used sufficient quantity of air could not be drawn in through the inlet openings to produce a uniform stream across the entire width of the cleaning system. Thus the fan means 77 disclosed herein includes a first end feed casing 78 and a second end feed casing 83. The first end feed casing 78 includes an outer air inlet 79, an inner air inlet 80, and a flared discharge nozzle 81. The second end feed casing 83 includes an outer air inlet 84, an inner air inlet 85 and a flared discharge nozzle 86. There is a first fan blade assembly 82 within the first end feed casing and a second fan blade assembly 87 within the second end feed casing. The first and second end feed casings 78, 83 are axially aligned with their inner air inlets 80 and 85 spaced from each other. There is a solid divider sheet 95 located between inner air inlets 80 and 85 to prevent one fan from stealing air from the other. Thus the fan means 77 has four air inlets 79, 80, 84 and 85 and two flared discharge nozzles 81 and 86 which together produce a uniform stream of air across the entire width of the grain cleaning system. There is a common drive shaft 88 extending through both the first and second end feed casings upon which is mounted the first and second blade assemblies 82 and 87. As can be seen in FIG. 4 the drive shaft 88 is supported at its midpoint and ends by bearings 89 and there is a pulley 90 secured to one end of the drive shaft. Rotary motion is supplied to the blade assemblies 82 and 87 through the pulley 90. A screen cage 91 is provided around the air inlet openings 79, 80, 84 and 85 to prevent debris from being pulled into the fan means 77. The screen cage 91 includes a front sheet 92 and end sheets 93 which form a stack having an open top 94. As can be best visualized in FIG. 4 the flared discharge nozzles 81 and 86 cause the stream of air from each of the end feed casings 78, 83 to widen.

OPERATION

The crop to be harvested is severed and fed by the header 14 into the forward end of the cylindrical casing 23. The impeller blades 22 of the elongated rotor 21 and the spiral flightings 24 of the cylindrical casing 23 cause the material to be fed from the front to the rear of the combine. The grain is removed from the plant as it moves through the threshing and separating mechanism 20 and passes through the concave 25 and the grate 26. The material passing through the concave 25 and grate 26 is collected on the elongated grain pan 27 and is fed rearwardly by the pan augers 41. The pan augers 41 are designed to spread the material into a wider swath as the material flows over the transverse ledge 30 of the grain pan. As the material moves over the transverse ledge 30 it encounters the distributing means 60 which evenly distributes the material over a width equal to the grain cleaning system. The beater fingers 49 carried by the cores of the pan augers 41 function to prevent material buildup at the intersection of the pan augers with the shielding means 46. The material from the grain pan 27 that has been spread by the distributing means 60 falls upon the short shaker pan 69 which moves the material rearwardly and drops it towards the upper sieve 72 of the grain cleaning system 70. As the material falls toward the sieve 72 and as it is processed rearwardly over the sieve, it encounters the air stream from the fan means 77. This air stream is of sufficient velocity to carry away any light materials such as chaff and dust and thus permits a clean sample of material to be collected in the clean grain trough 75.

The material that is drawn into the fan means 77 enters the first and second end feed casings 78 and 83 through the four air inlets 79, 89, 84 and 85 to thus provide a sufficient supply of air to be discharged through the flared discharge nozzles 81, 86. The air flowing into the end feed casings passes through the screen cage 91 which prevents debris such as leaves from being drawing into the fan means 77. In the event that debris completely closes off the screen cage 91, it is possible for unfiltered air to be drawn through the open top 94 into the air inlets 79 and 84 and thus the fan means will not be completely starved of air. It should be noted that the open tops 94 are at the highest elevation of the fan and thus there is a smaller likelihood that air taken from this position will be laden with debris.

We claim:

1. In a self-propelled combine of the type having a longitudinally extending chassis, a pair of front drive sheets supported along a transverse axis, a threshing mechanism located above said transverse axis and between said front drive wheels, and a grain cleaning system located at a lower level than said threshing mechanism and rearwardly of said front drive wheels, said grain cleaning system having outer edges and wherein the improvement comprises:

an elongated grain pan having longitudinal outer edges disposed below said threshing mechanism and terminating along a transverse ledge rearwardly of said front drive wheels, the transverse dimensions of said grain pan being such that it lies between said pair of front drive wheels, the upper surface of said elongated grain pan formed of a plurality of longitudinal troughs;

means associated with said grain pan for feeding material rearwardly thereof including a pan auger corresponding to each of said troughs, each of said pan augers including a core and a flighting, said pan auger flightings terminating over said elongated grain pan and the cores extending beyond said transverse ledge;

a transverse drive means rearwardly of said transverse ledge in driving engagement with said auger cores and functioning to provide drive thereto;

feeder fingers carried by said auger cores adjacent said transverse drive means to prevent bridging and bunching of material in this area;

distributing means at said transverse ledge for evenly spreading the material over a swath wider than the width of said threshing mechanism; and said grain cleaning system being disposed to receive material from said distributing means, and the width of said grain cleaning system as defined by the outer edges exceeding the width of said threshing mechanism.

2. The invention as set forth in claim 1 wherein said grain cleaning system includes fan means, said fan means including a pair of axially aligned end feed casings spaced from each other so that each end feed casing has an outer air inlet and an inner air inlet, each said end feed casings further including flared discharge nozzles that function to coordinate the discharge of said fan means with the grain cleaning mechanism.

3. In a self-propelled combine of the type having a longitudinally extending chassis, a pair of front drive wheels supported along a transverse axis, a threshing mechanism located above said transverse axis between said front drive wheels, and a grain cleaning system located at a lower level than said threshing mechanism and rearwardly of said front drive wheels said grain cleaning system having outer edges and wherein the improvement comprises:

an elongated grain pan having longitudinal outer edges disposed below said threshing mechanism terminating along a transverse ledge rearwardly of said front drive wheels, the transverse dimensions of said grain pan being such that it lies between said pair of front drive wheels, the upper surface of said elongated grain pan formed of a plurality of longitudinal troughs;

means associated with said grain pans for feeding material rearwardly thereof including a pan auger corresponding to each of said troughs, and wherein each of said pan augers includes a core and a flighting, there being an uneven number of pan augers in corresponding troughs and wherein the flighting of the central pan auger is terminated at a point forward of said transverse ledge so that the distribution pattern of the central pan auger is concentrated about the central portion of the grain cleaning system;

distributing means at the transverse ledge of said grain pan for evenly spreading the material over a swath wider than the width of said threshing mechanism; and said grain cleaning system being disposed to receive material from said distributing means, and the width of said grain cleaning system as defined by said outer edges exceeding the width of said threshing mechanism.

4. In a self-propelled combine of the type having a longitudinally extending chassis, a pair of front drive wheels supported along a transverse axis, a threshing mechanism located above said transverse axis and between said front drive wheels, and a grain cleaning system located at a lower level than said threshing mechanism and rearwardly of said front drive wheels, said grain cleaning system having outer edges and wherein the improvement comprises:

an elongated grain pan having longitudinal outer edges disposed below said threshing mechanism and terminating along a transverse ledge rearwardly of said front drive wheels, the transverse dimension of said grain pan being such that it lies between said pair of front drive wheels, the upper surface of said elongated grain pan formed of a plurality of longitudinal troughs;

means associated with said grain pan for feeding material rearwardly thereof including a pan auger corresponding to each of said troughs, and wherein each of said pan augers includes a core and a flighting;

distributing means at said transverse ledge for evenly spreading the material over a swath wider than the width of said threshing mechanism, said distributing means including a cross auger having a core and a flighting with its axis disposed rearwardly of said transverse ledge and below the core of said pan augers, said cross auger flighting extending beyond the outer edges of said grain pan and terminating within the confines of said grain cleaning system; and said grain cleaning system being disposed to receive material from said distributing means, and the width of said grain cleaning system as defined by said outer edges exceeding the width of said threshing mechanism.

5. In a self-propelled combine of the type having a longitudinally extending chassis, a pair of front drive wheels supported along a transverse axis, a threshing mechanism located above said transverse axis between said front drive wheels, and a grain cleaning system located at a lower level than said threshing mechanism and rearwardly of said front drive wheels, said grain cleaning system having outer edges and wherein the improvement comprises:

an elongated grain pan having longitudinal outer edges disposed below said threshing mechanism and terminating along a transverse ledge rearwardly of said front drive wheels, the transverse dimensions of said grain pan being such that it lies between said pair of front drive wheels, the upper surface of said elongated grain pan formed of a plurality of longitudinal troughs;

means associated with said grain pan for feeding material rearwardly thereof including a pan auger corresponding to each of said troughs, and wherein each of said pan augers includes a core and a flighting;

distributing means at the transverse ledge of said grain pan for evenly spreading the material over a swath wider than the width of said threshing mechanism, said distributing means including a cross auger having a core and a flighting with its axis disposed rearwardly of said transverse ledge, said cross auger flighting extending beyond the outer edges of said grain pan and terminating within the confines of said grain cleaning system; and said grain cleaning system being disposed to receive material from said distributing means, and the width of said grain cleaning system as defined by said outer edges exceeding the width of said threshing mechanism.

6. The invention as set forth in claim 5 wherein said grain cleaning system includes fan means, said fan means including a pair of axially aligned end feed casings spaced from each other so that each end feed casing has an outer air inlet and an inner air inlet, each of said end feed casings further including flared discharge nozzles that function to coordinate the discharge of said fan means with the grain cleaning mechanism.

7. In a self-propelled combine of the type having a longitudinally extending chassis, a pair of front drive wheels supported along a transverse axis, a threshing mechanism located above said transverse axis and between said front drive wheels, and a grain cleaning system located at a lower level than said threshing mechanism and rearwardly of said front drive wheels, said grain cleaning system having outer edges and wherein the improvement comprises:

an elongated grain pan having longitudinal outer edges disposed below said threshing mechanism and terminating along a transverse ledge rearwardly of said front drive wheels, the transverse dimensions of said grain pan being such that it lies between said pair of front drive wheels;

means associated with said grain pan for feeding material rearwardly thereof;

distributing means at the transverse ledge of said grain pan for evenly spreading the material over a swath wider than the width of said threshing mechanism, said distributing means including a cross auger having a core and a flighting with its axis disposed rearwardly of said transverse ledge, a cross auger flighting extending beyond the outer edges of said grain pan and terminating within the confines of said grain cleaning system; and said grain cleaning system being disposed to receive material from said distributing means, and the width of said grain cleaning system as defined by said outer edges exceeding the width of said threshing mechanism.

8. The invention as set forth in claim 7 wherein said grain cleaning system includes fan means, said fan means including a pair of axially aligned end feed casings spaced from each other so that each end feed casing has an outer air inlet and an inner air inlet, each of said end feed casings further including flared discharge nozzles that function to coordinate the discharge of said fan means with the grain cleaning mechanism.

9. In a self-propelled combine of the type having a longitudinally extending chassis, a pair of front wheels supported along a transverse axis, a threshing mechanism located above said transverse axis and between said front drive wheels, and a grain cleaning system located at a lower level than said threshing mechanism and rearwardly of said front drive wheels, said grain cleaning system having outer edges and wherein the improvement comprises:

an elongated grain pan having longitudinal outer edges disposed below said threshing mechanism and terminating along a transverse ledge rearwardly of said front drive wheels, the transverse dimensions of said grain pan being such that it lies between said pair of front drive wheels;

means associated with said grain pan for feeding material rearwardly thereof;

distributing means at the transverse ledge of said grain pan for evenly spreading the material over a swath wider than the width of said threshing mechanism; and said grain cleaning system being disposed to receive material from said distributing means, and the width of said grain cleaning system as defined by said outer edges exceeding the width of said threshing mechanism, said grain cleaning system includes fan means, said fan means including a pair of axially aligned end feed casings spaced from each other so that each end feed casing has an outer air inlet and an inner air inlet, each of said end feed casings further including flared discharge nozzles that function to coordinate the discharge of said fan means with the grain cleaning mechanism, and a solid divider sheet between the inner ends of said end feed casings to prevent one fan from stealing air from the other.